(12) United States Patent
Mayers et al.

(10) Patent No.: US 12,554,883 B2
(45) Date of Patent: Feb. 17, 2026

(54) SYSTEMS AND METHOD FOR AUTO-REDACTING DATA IN A SHARED-GRAPHICAL-USER-INTERFACE ENVIRONMENT

(71) Applicant: BANK OF AMERICA CORPORATION, Charlotte, NC (US)

(72) Inventors: Kyle Mayers, Charlotte, NC (US); Mohamed Faris Khaleeli, Charlotte, NC (US); Elizabeth Liuzzo, Fort Mill, SC (US); Justin Miller, Fort Mill, SC (US); Vinit Shah, Indian Trail, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 10 days.

(21) Appl. No.: 18/794,758

(22) Filed: Aug. 5, 2024

(65) Prior Publication Data

US 2026/0037664 A1    Feb. 5, 2026

(51) Int. Cl.
*G06F 21/62* (2013.01)
*G06F 3/0484* (2022.01)
*G06F 40/279* (2020.01)
*G06F 40/40* (2020.01)
*G06N 7/01* (2023.01)
*G06F 3/0482* (2013.01)

(52) U.S. Cl.
CPC ........ *G06F 21/6245* (2013.01); *G06F 3/0484* (2013.01); *G06F 40/279* (2020.01); *G06F 40/40* (2020.01); *G06N 7/01* (2023.01); *G06F 3/0482* (2013.01)

(58) Field of Classification Search
CPC .................................................. G06F 21/3245
See application file for complete search history.

(56) References Cited

U.S. PATENT DOCUMENTS

| | | | | |
|---|---|---|---|---|
| 10,902,202 | B2 * | 1/2021 | Aumann | G06F 16/1744 |
| 2014/0149363 | A1 * | 5/2014 | Leeds | G06F 16/2365 |
| | | | | 707/691 |
| 2021/0064781 | A1 * | 3/2021 | Raphael | G06F 21/6254 |
| 2022/0269820 | A1 * | 8/2022 | Singh Bawa | G06F 18/214 |

* cited by examiner

*Primary Examiner* — Bradley W Holder
(74) *Attorney, Agent, or Firm* — Moore & Van Allen PLLC; R.W. McCord Rayburn

(57) ABSTRACT

Systems, computer program products, and methods are described herein for auto-redacting data in a shared-GUI environment. The present invention is configured to receive an input request to transmit a continuous data stream; analyze the available data to identify sensitive data; flag the sensitive data to generate flagged data; generate a dataset comprising data elements of the flagged data and location data of the flagged data; for each data element of the flagged data: analyze the data element to determine whether it is a sensitive data element; generate a label for the sensitive data element; and store the generated label, the sensitive data element, and the location data of the sensitive data element in a data structure; redact sensitive data elements from the available data to generate a redacted continuous data stream; generate a prompt requesting acceptance of the redacted continuous data stream; and transmit the redacted continuous data stream.

20 Claims, 9 Drawing Sheets

SYSTEMS AND METHOD FOR AUTO-REDACTING DATA IN A SHARED-GRAPHICAL-USER-INTERFACE ENVIRONMENT

FIELD OF THE INVENTION

The present invention embraces a system for auto-redacting data in a shared-graphical-user-interface environment.

BACKGROUND

Issues arise in online communications when images of a graphical user interface (GUI) are shared (e.g., online meetings) in real time or near real time. Such screen shares may comprise data that is sensitive and meant to be secure from the viewers.

Applicant has identified a number of deficiencies and problems associated with auto-redacting data in a shared-GUI environment. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for auto-redacting data in a shared-GUI environment may include: a memory device with computer-readable program code stored thereon; and at least one processing device operatively coupled to the at least one memory device and the at least one communication device. In some embodiments, executing the computer-readable code is configured to cause the at least one processing device to: receive an input request to transmit, in real-time, a continuous data stream comprising available data; analyze, in response to the input request, the available data in a plurality of data storage locations to identify sensitive data and non-sensitive data; flag the sensitive data to generate flagged data; generate a dataset comprising data elements of the flagged data and location data identifying locations of the data elements of the flagged data; for each data element of the flagged data, (i) analyze the data element to determine whether the data element is a sensitive data element, (ii) generate a label for the sensitive data element, and (iii) store the generated label, the sensitive data element, and the location data of the sensitive data element in a data structure; redact sensitive data elements of the flagged data from the available data using the data structure to generate a redacted continuous data stream comprising the redacted sensitive data elements and the non-sensitive data; generate a prompt requesting acceptance of the redacted continuous data stream; and transmit, in response to receiving acceptance of the prompt, the redacted continuous data stream.

In some embodiments, a generative artificial intelligence (AI) is configured to perform the steps of analyzing all available data for sensitive data, flag data from that available data that is sensitive, and generate a dataset comprising data elements of the flagged data and a plurality of data associated with a location of the data elements of the flagged data.

In some embodiments, a language model is configured to perform the analysis of a data element of the flagged data from the dataset, and the analysis comprises: selecting a data element from the flagged data; navigating, using the location data associated with the data element, to a location of the data element; analyzing data elements in the vicinity of the data element of the flagged data; contextualizing the data element of the flagged data; and calculating a probability that the data element of the flagged data falls into a sensitive data category.

In some embodiments, the redacted continuous data stream is transmitted to a plurality of networked devices.

In some embodiments, the transmission of the redacted continuous data stream is delayed by a period of time to the plurality of networked devices.

In some embodiments, upon new available data, the system is configured to analyze the new available data and redact new sensitive data under the period of time.

In some embodiments, the prompt comprises a text box comprising: a list of the redacted data elements of the flagged data; an option to un-redact a redacted data element of the flagged data for each redacted data element of the flagged data; and an option to proceed with or terminate the input request to transmit.

In some embodiments, a report of all redacted data is stored upon termination of the redacted continuous data stream.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
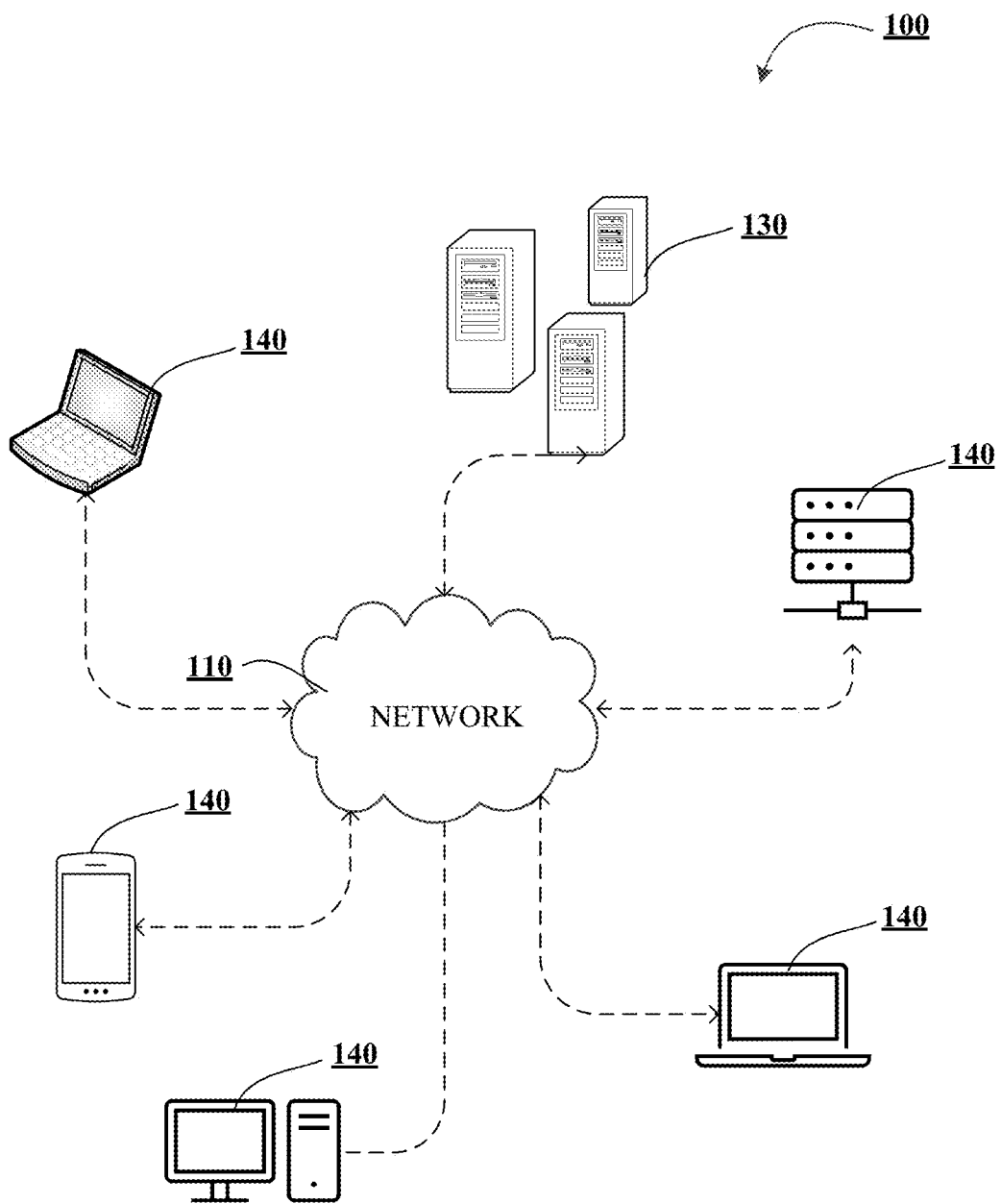
Figure 1B:
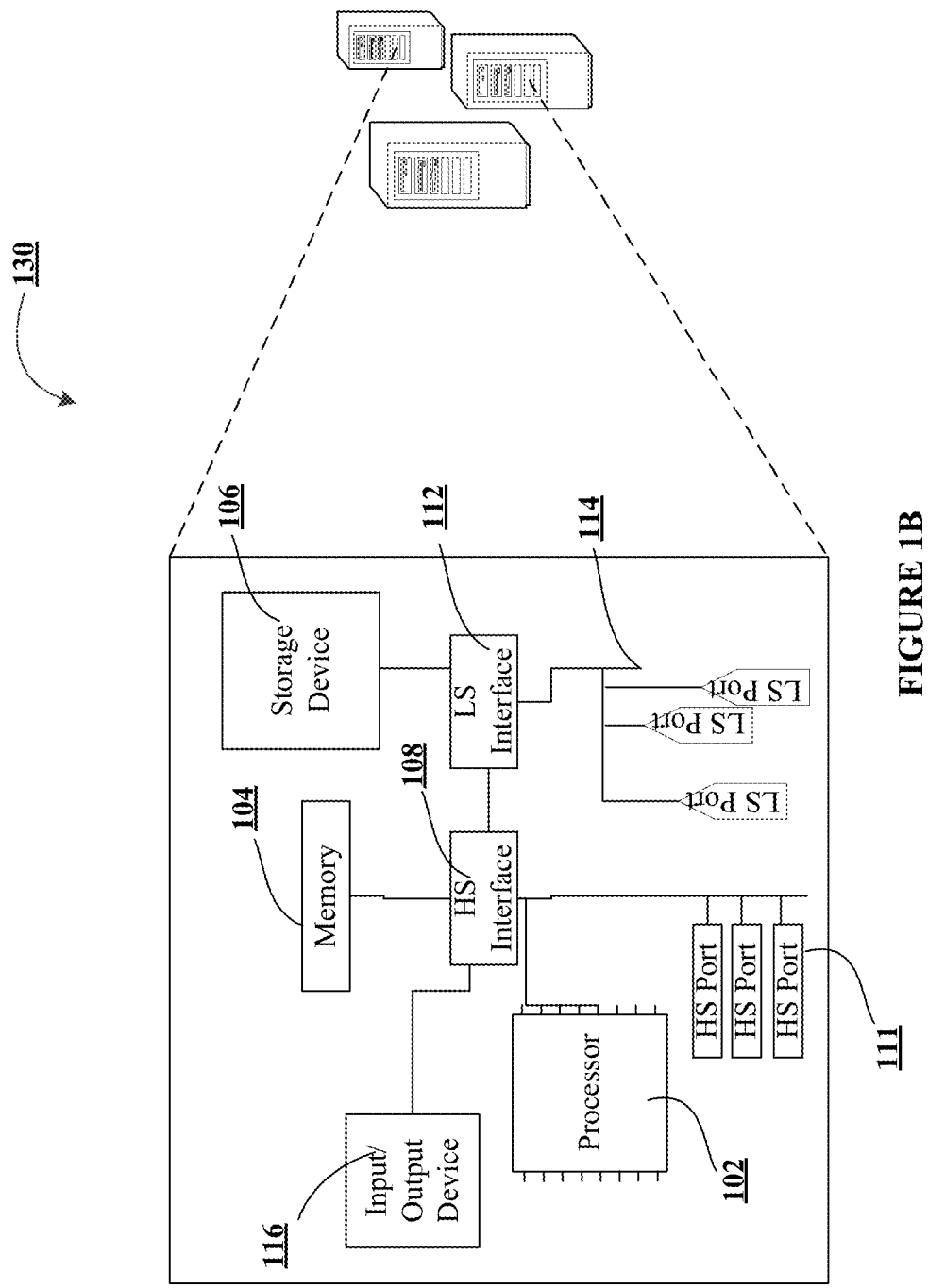
Figure 1C:
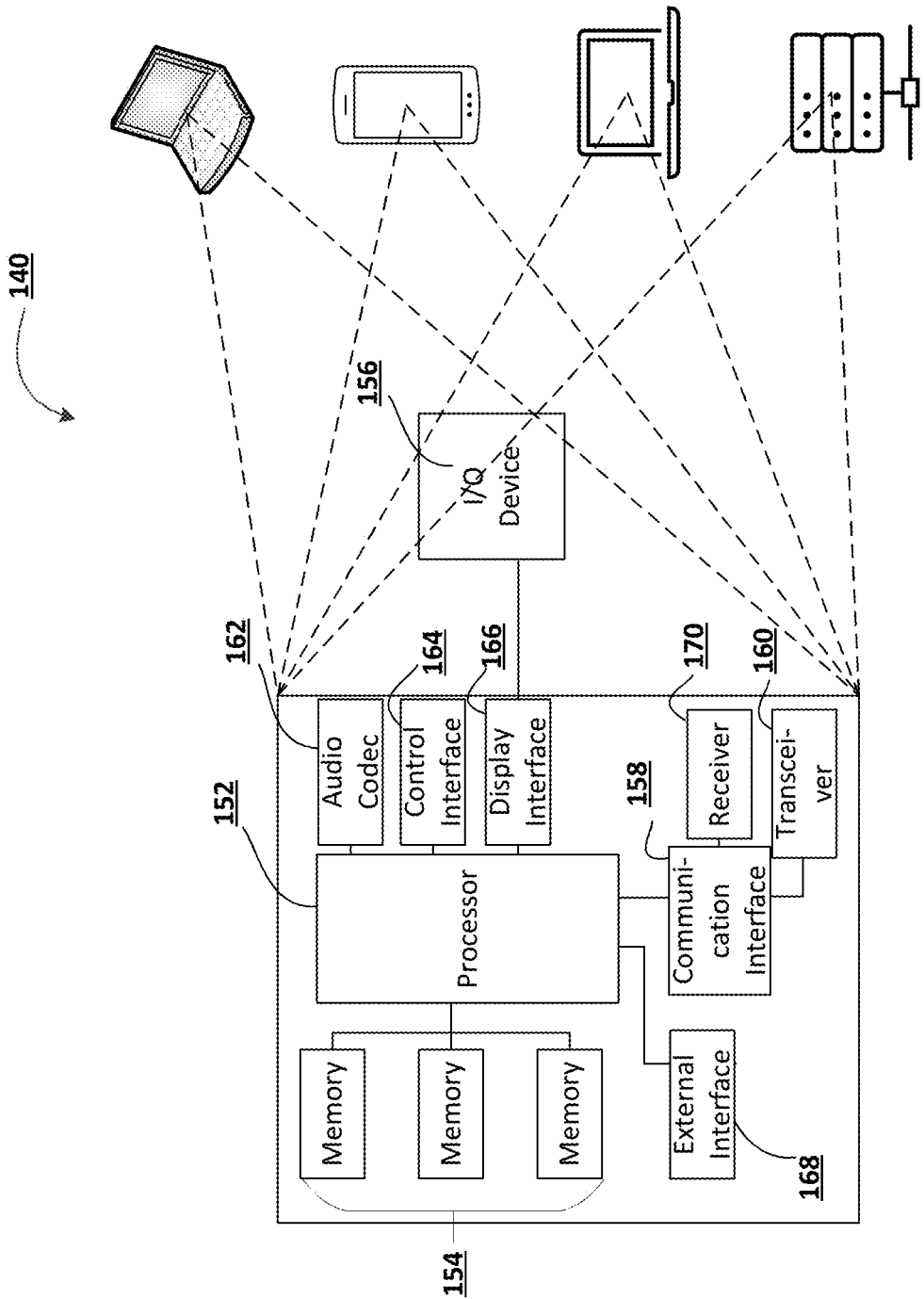
Figure 2:
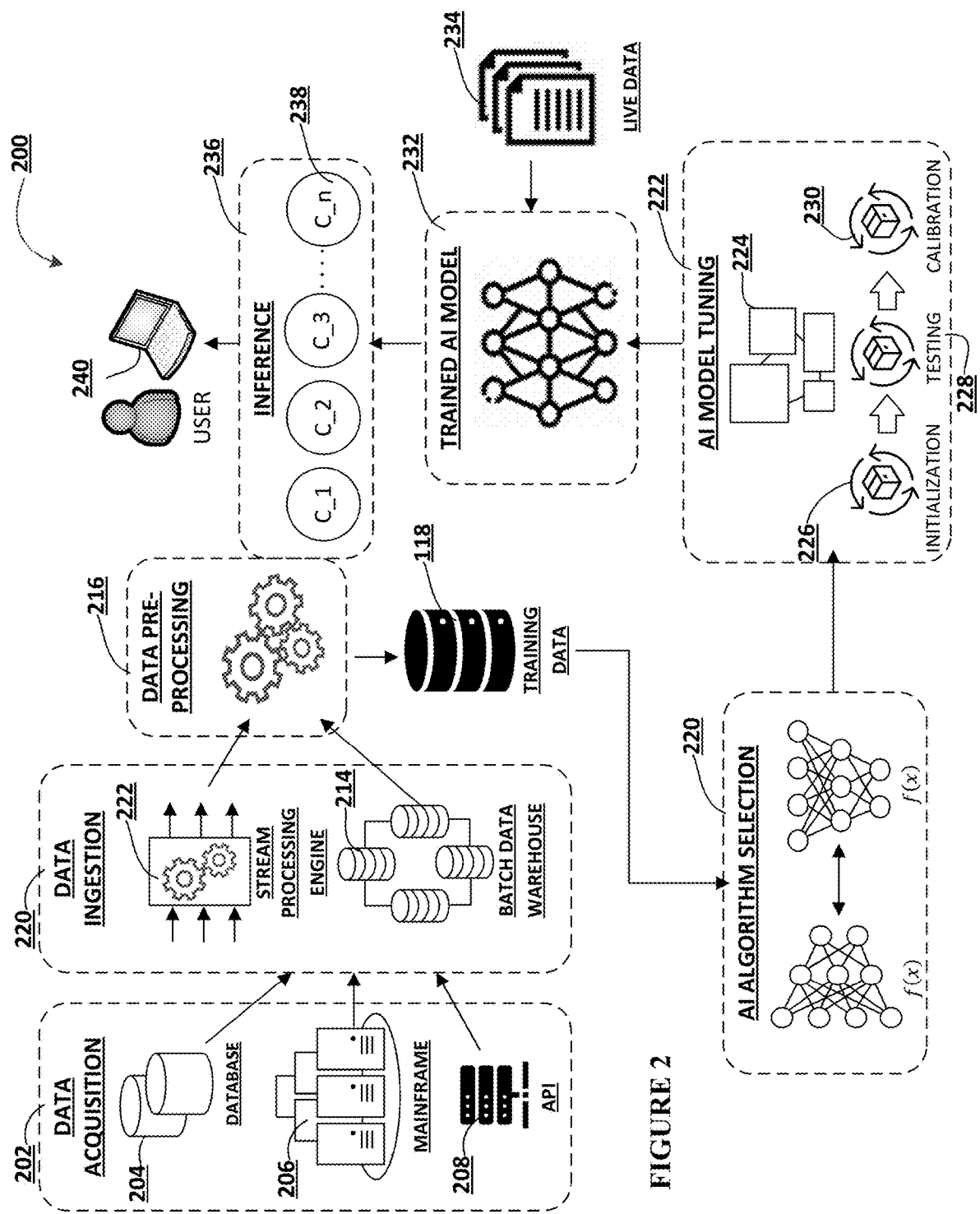
Figure 3:
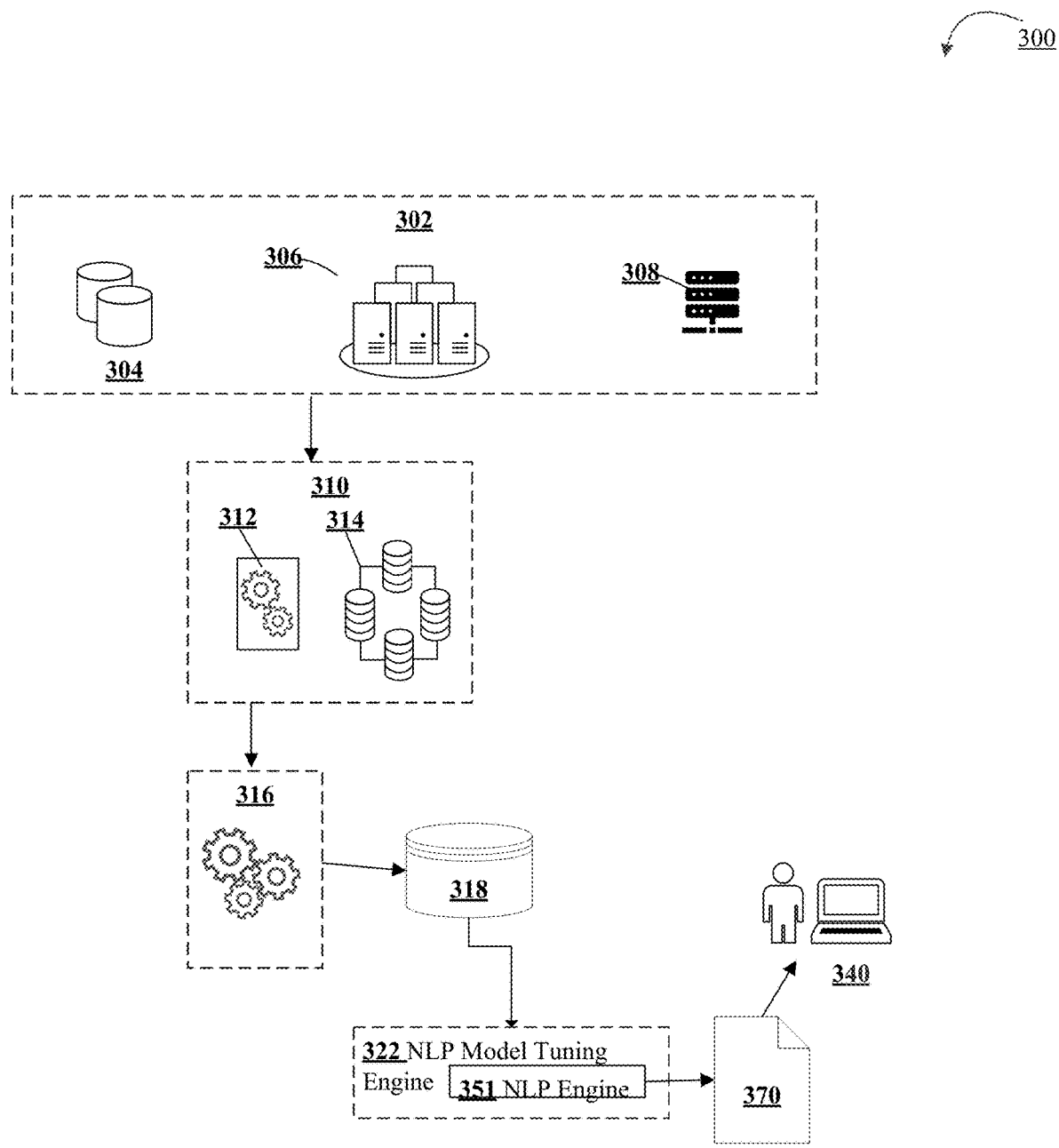
Figure 4A:
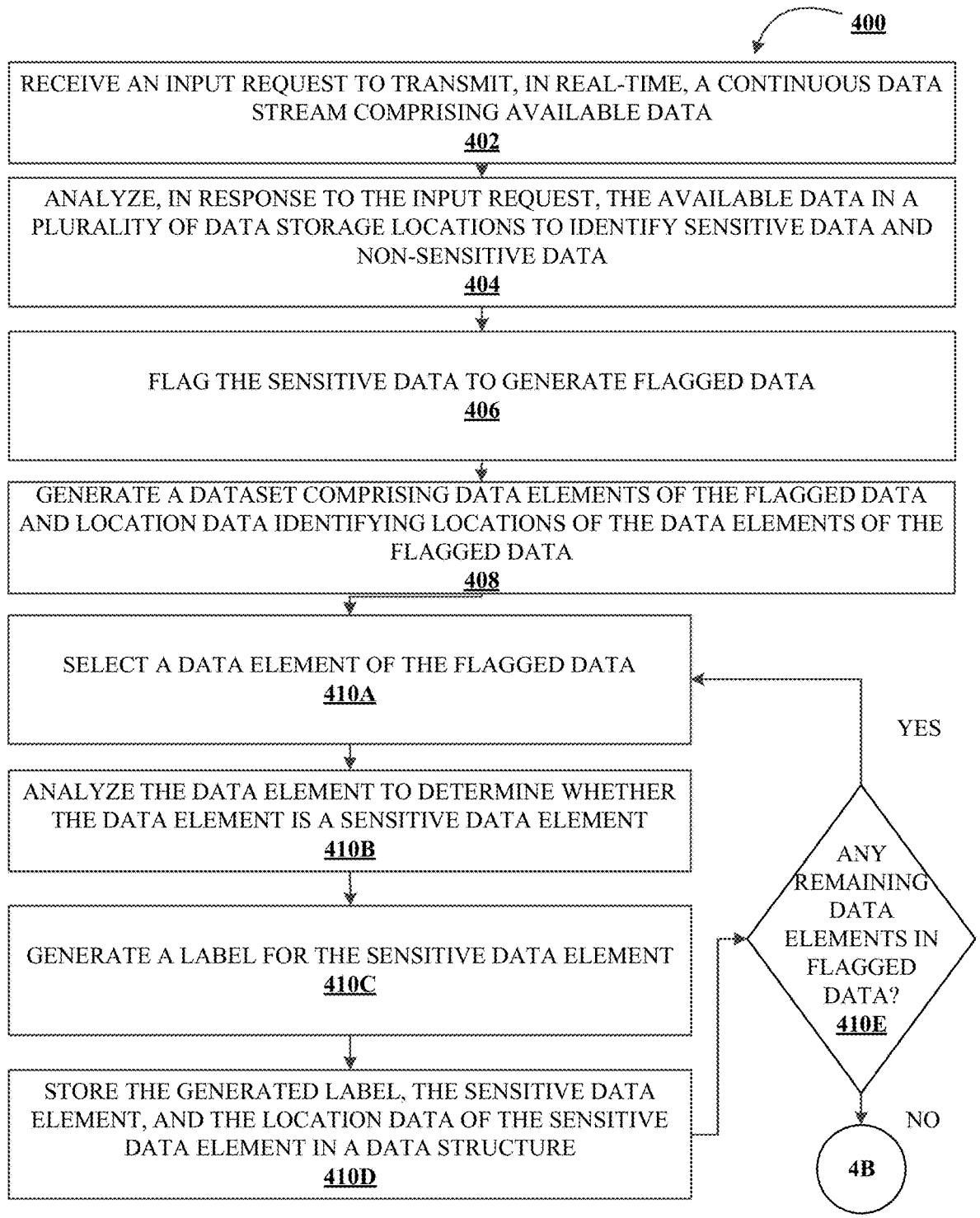
Figure 4B:
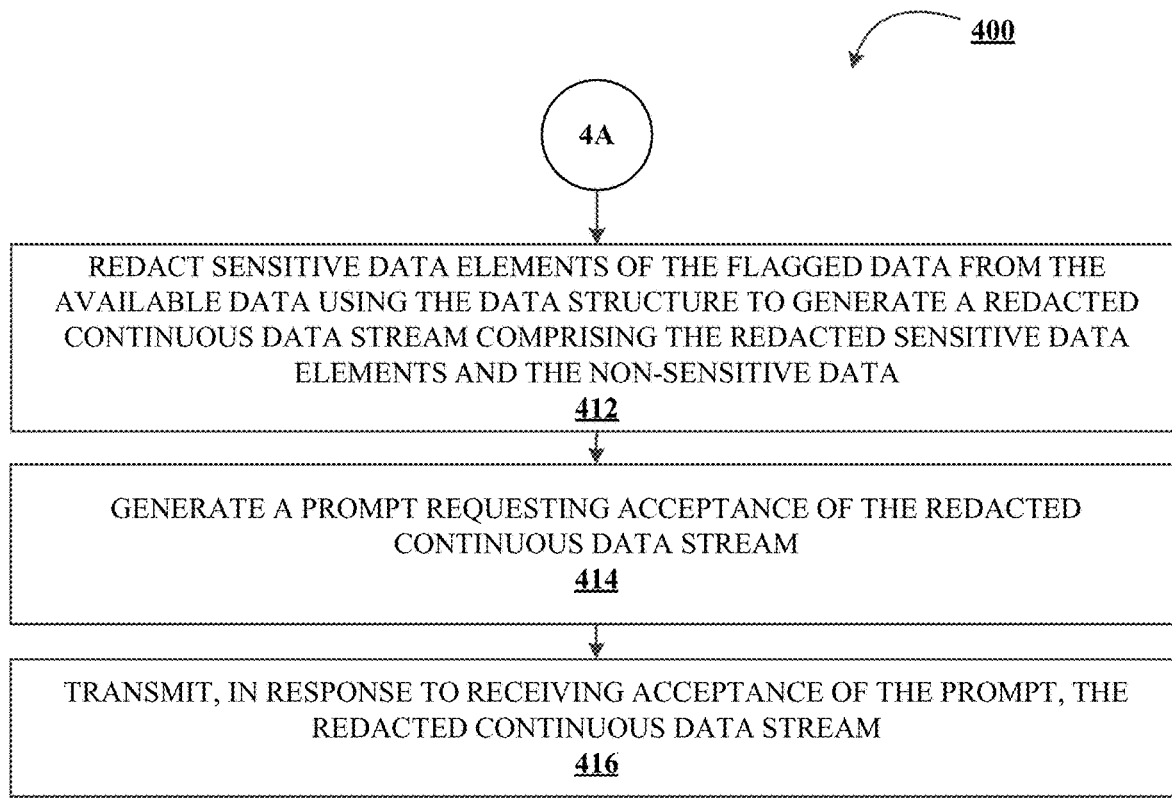
Figure 5:
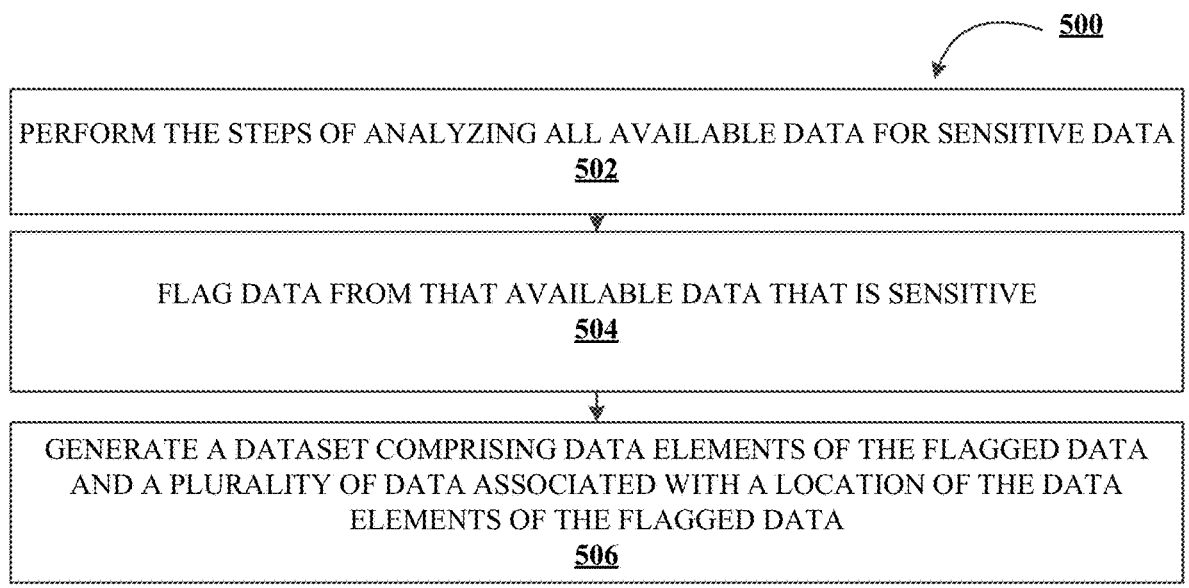
Figure 6:
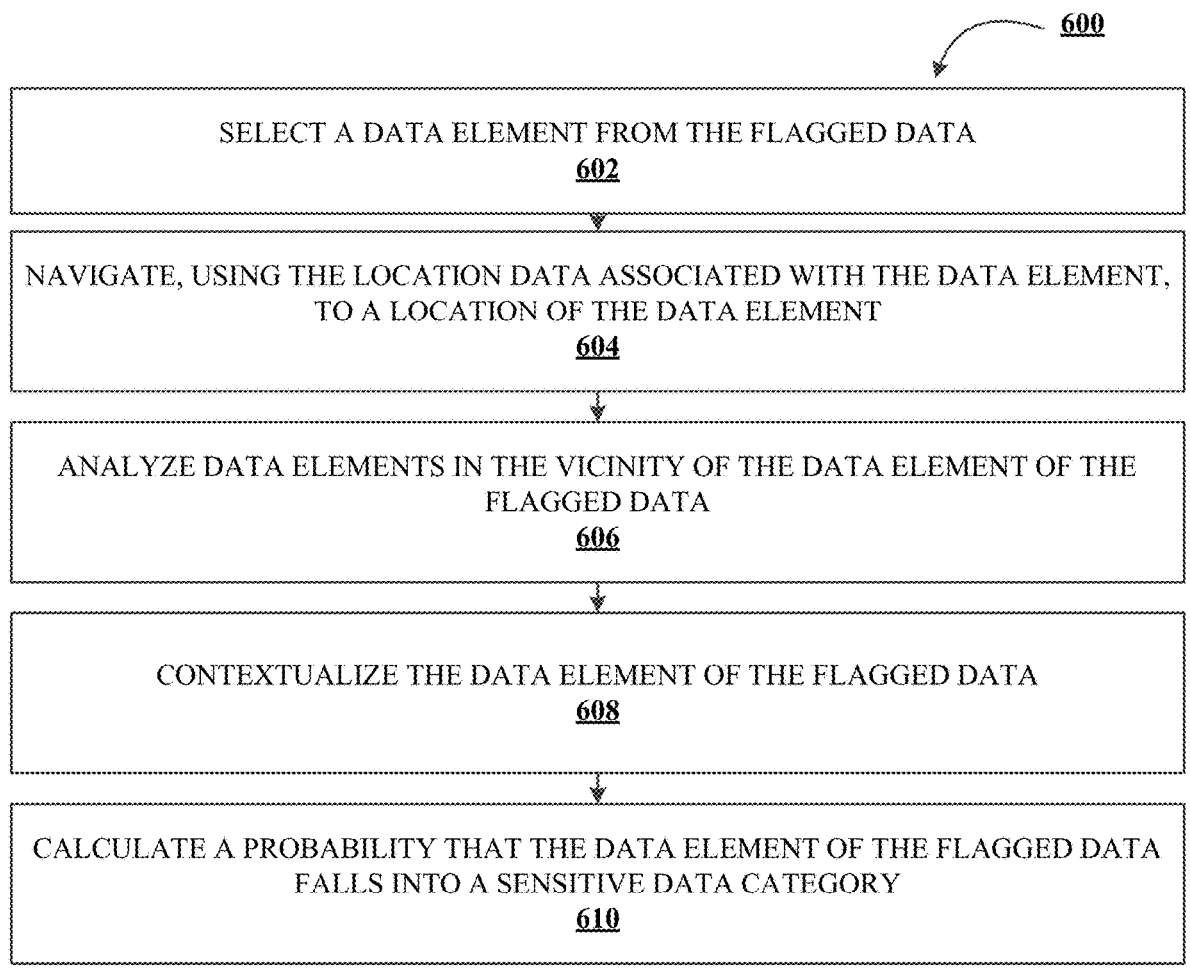

Having thus described embodiments of the invention in general terms, reference will now be made the accompanying drawings, wherein:

FIGS. 1A-1C illustrate technical components of an exemplary distributed computing environment for auto-redacting data in a shared-GUI environment, in accordance with an embodiment of the disclosure;

FIG. 2 illustrates an exemplary artificial intelligence (AI) engine subsystem architecture for auto-redacting data in a shared-GUI environment, in accordance with an embodiment of the disclosure;

FIG. 3 illustrates an exemplary Natural Language Processing (NLP) subsystem architecture for auto-redacting data in a shared-GUI environment, in accordance with an embodiment of the disclosure;

FIGS. 4A-4B illustrate a process flow for auto-redacting data in a shared-GUI environment, in accordance with an embodiment of the disclosure;

FIG. 5 illustrates a process flow for a generative AI as a step in auto-redacting data in a shared-GUI environment, in accordance with an embodiment of the disclosure; and FIG. 6 illustrates a process flow for a large language model (LLM) as a step in auto-redacting data in a shared-GUI environment, in accordance with an embodiment of the disclosure;

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

As used herein, a "resource transfer," "resource distribution," or "resource allocation" may refer to any transaction, activities, or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

The present disclosure provides systems, computer programs, and methods for auto-redacting data in a shared-GUI environment. In an example embodiment, the invention discloses a computer program including a generative artificial intelligence (AI) model for analyzing available data and flagging any data determined to be sensitive data. Further, the computer program leverages a natural language processing (NLP) model (e.g., a large language model (LLM)) to contextualize any of the flagged data to determine if the flagged data is sensitive.

Issues arise in online communications when images of a GUI are shared (e.g., online meetings) in real time or near real time. Such screen shares may comprise data that is sensitive and meant to be secure from the viewers. As such, there is a need for systems, computer programs, and methods for auto-redacting data in a shared-GUI environment that may remedy the problems that arise with sharing data in real time with a plurality of networked devices.

Presently, online communication, where images of a GUI of a user are broadcasted continuously, is becoming more commonplace. Oftentimes, data on the GUI contains elements that are not intended to be shared (e.g., sensitive data) and pose a potential threat to the user or entities related to the user if accidently shared via an online communication. There is a need for systems, computer programs, and/or methods that prevent data elements not intended to be shared from being shared (e.g., redacting the data elements) upon initiation of a continuous broadcast of images of a GUI (e.g., selecting screen share on an online communications platform).

Embodiments of the present disclosure may include a plurality of AI and/or ML models configured to prevent sensitive data from being shared to non-intended sources. A generative AI model may be used to scan available data on the GUI of a user upon initiation of a continuous broadcast of images of the GUI. As the generative AI model scans the available data, the generative AI model may analyze the scanned data and flag any of the scanned data that the generative AI model has determined to be sensitive in nature. A set of data containing at least the flagged data and the locations of each flagged data element may be used by an NLP model to further analyze those data elements to reach a determination on the sensitive status of the flagged data elements. Any flagged data element determined to be sensitive may then be redacted prior to broadcasting the images of the GUI to a plurality of networked devices.

Accordingly, the present invention discloses a system, computer program, and method for auto-redacting data that includes data elements not intended to be shared (e.g., sensitive data) and that pose a potential threat to the user or entities related to the user if accidently displayed in a shared-GUI environment (e.g., online screen sharing). Embodiments of the present disclosure may include a plurality of artificial intelligence (AI) and/or machine learning (ML) models configured to prevent sensitive data from being shared to non-intended sources. In an example embodiment, a generative AI model may be configured to analyze available data (e.g., data in files, programs, documents, and/or the like) for sensitive data on a GUI of a user upon initiation of a continuous broadcast of images of the GUI (e.g., selecting screen share on an online communications platform). Further, the generative AI may be configured to flag data that may be potentially sensitive data. Additionally, a natural language processing (NLP) model (e.g., a large language model (LLM)) may be leveraged to contextualize any of the flagged data to determine if the flagged data is sensitive data. In some embodiments, the NLP model may be configured to use at least the flagged data and the locations of each flagged data element to further analyze those data elements to reach a determination on the sensitive status of the flagged data elements. Further, flagged data elements determined to be sensitive by the NLP may then be redacted prior to broadcasting the images of the GUI to a plurality of networked devices.

What is more, the present invention provides a technical solution to a technical problem. As described herein, the technical problem includes redacting data in a shared-GUI environment. The technical solution presented herein allows for a generative AI model combined with an NLP model to quickly and accurately analyze and redact sensitive data in a shared-GUI environment. In other words, a system, computer program, and/or method configured to auto-redact sensitive data, in real time, upon initiation of a broadcast of images of a GUI. In particular, the generative AI model combined with an NLP model is an improvement over existing solutions to redacting sensitive data in a shared-GUI environment (i) with fewer steps to achieve the solution, thus reducing the amount of computing resources, such as processing resources, storage resources, network resources, and/or the like, that are being used (e.g., by using AI and/or NLP techniques, the system is able to dynamically and automatically determine and redact sensitive data when a continuous data transmission is initiated, without the need for additional resource use of transferring data across a network for remote evaluation), (ii) providing a more accurate solution to the problem, thus reducing the number of resources required to remedy any errors made due to a less accurate solution (e.g., by using a plurality of AI and/or NLP models, the system may be configured to transmit the resulting data of an analysis of a first AI and/or NLP model to additional AI and/or NLP models to further verify the result is accurate thus producing an increasingly accurate analysis of determining the sensitivity of a data element on a GUI), (iii) removing manual input and waste from the implementation of the solution, thus improving speed and efficiency of the process and conserving computing resources (e.g., by using generative AI, the system may be configured to proactively redact sensitive data on a GUI from being transmitted and displayed to a plurality of unauthorized networked devices thus reducing user time and computational resource time spent manually searching and manually redacting sensitive data prior to broadcasting images of the GUI), (iv) determining an optimal amount of resources that need to be used to implement the solution, thus reducing network traffic and load on existing computing resources (e.g., by using a plurality of AI and/or NLP models, the system may optimize the process of determining sensitive data and may determine sensitive data accurately such that resources spent correcting inaccurate assessment are minimized, thus reducing load on computer resources). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing AI to auto-redact data in a shared-GUI environment, in accordance with an embodiment of the invention. As shown in FIG. 1A, the distributed computing environment 100 contemplated herein may include a system 130 (i.e., a data auto-redaction system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O)

device 116, and a storage device 106. The system 130 may also include a high-speed interface 108 connecting to the memory 104, and a low-speed interface 112 (shown as "LS Interface") connecting to low speed bus 114 (shown as "LS Port") and storage device 106. Each of the components 102, 104, 106, 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200 for auto-redacting data in a shared-GUI environment, in accordance with an embodiment of the disclosure. The artificial intelligence subsystem 200 may include a data acquisition engine 202, data ingestion engine 210, data pre-processing engine 216, AI tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so an artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates an exemplary Natural Language Processing (NLP) subsystem architecture 300 for auto-redacting data in a shared-GUI environment, in accordance with an embodiment of the disclosure. The NLP subsystem 300 may include a data acquisition engine 302, data ingestion engine 310, data pre-processing engine 316, NLP model tuning engine 322, inference engine 336, and NLP engine 351.

The data acquisition engine 302 may identify various internal and/or external data sources to generate, test, and/or integrate new features for training the NLP engine 351 (such as by gathering at least one unstructured datasets like that shown in as datasets 306). These internal and/or external data sources 304, 306, and 308 may be initial locations where the data originates or where physical information is first digitized (such as within a database, such as a database of change requests, modifications, and/or the like). The data acquisition engine 302 may identify the location of the data and describe connection characteristics for access and retrieval of data.

In some embodiments, data is transported from each data source 304, 306, or 308 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 304, 306, and 308 may include databases associated with computer programming modifications by development teams and their associated change requests that precipitated the modifications, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 302 from these data sources 304, 306, and 308 may then be transported to the data ingestion engine 310 for further processing.

Depending on the nature of the data imported from the data acquisition engine 302, the data ingestion engine 310 may move the data to a destination for storage or further analysis. Typically, the data imported from the data acquisition engine 302 may be in varying formats as they come from different sources, including RDBMS, other types of databases, S3 buckets, CSVs, or from streams. In some embodiments, and since the data may come from different places, it may need to be cleansed and transformed so that it can be analyzed together with data from other sources, such as by cleansing the data of non-important text such as periods (".") and/or the like. At the data ingestion engine 310, the data may be ingested in real-time, using the stream processing engine 312, in batches using the batch data warehouse 314, or a combination of both. The stream processing engine 312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 314 collects and transfers data in batches according to scheduled intervals, trigger events, or any other logical ordering.

In natural language processing, the quality of data and the useful information that can be derived therefrom directly affects the ability of the natural language processing engine 351. The data pre-processing engine 316 may implement advanced integration and processing steps needed to prepare the data for NLP execution. This may include modules to perform any upfront, data transformation to consolidate the data into alternate forms by changing the value, structure, or format of the data using generalization, weightage values, fuzzy the terms of the unstructured datasets, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. In some embodiments, the training data 318 may comprise pre-labeled modifications, natural language interpretations, and/or the like. Further, and in some embodiments, the training data 318 may be pre-labeled by users associated with the development team of the computer program(s) and/or by a user that input the change requests. Feature extraction and/or selection is a process of dimensionality reduction by which an initial set of data is reduced to more manageable groups for processing. In some embodiments, the training data 318 may require further enrichment. For example, in supervised learning, the training data is enriched using one or more meaningful and informative labels to provide context so the NLP engine 351 can learn from it. In contrast, unsupervised learning uses unlabeled data to find patterns in the data, such as inferences or clustering of data points, such as by being trained on non-labeled change requests and associated modifications.

An NLP engine tuning engine 322 may be used to train the NLP engine 351 using the training data 318 to make predictions or decisions without explicitly being programmed to do so. The NLP engine 351 represents what was learned by a selected machine learning algorithm 320 and represents the rules, numbers, and any other algorithm-specific data structures required for classification.

In some embodiments, the NLP engine 351 may include machine learning supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the NLP engine 351, the NLP tuning engine 322 may repeatedly execute cycles of experimentation, testing, and tuning to optimize the performance of the NLP engine 351 and refine the results in preparation for deployment of those results for consumption or decision making. To this end, the NLP tuning engine 322 may vary hyperparameters each iteration, run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 318. A fully trained NLP engine 351 is one whose hyperparameters are tuned and accuracy maximized.

The trained NLP engine 351, similar to any other software application output, can be persisted to storage, file, memory, or application, or looped back into the processing component to be reprocessed. More often, the trained NLP engine 351 is deployed into an existing production environment to make accurate decisions on unstructured data based on live data (e.g., unstructured datasets and input data). For instance, such an unstructured dataset/a plurality of future unstructured datasets may be input to the training NLP engine 351 (which includes parsing the terms of the unstructured dataset(s), determining the meaning of each of the modifications and their purposes within the computer program, the meaning of the change requests, and/or the like. Further, and based on the structured dataset generated by the trained NLP engine 351, the computer language interpretation system may generate an interface component (e.g., a modification interpretation database, and/or the like).

It will be understood that the embodiment of the NLP subsystem 300 illustrated in FIG. 3 is exemplary and that other embodiments may vary. As another example, in some embodiments, the NLP subsystem 300 may include more, fewer, or different components.

FIGS. 4A-4B illustrate a process flow 400 for auto-redacting data in a shared-GUI environment, in accordance with an embodiment of the invention. In some embodiments, a system (e.g., similar to one or more of the systems described herein with respect to FIGS. 1A-1C) may perform one or more of the steps of process flow 400. For example, a data auto-redaction system (e.g., the system 130 described herein with respect to FIG. 1A-1C) may perform the steps of process 400. In some embodiments, an artificial intelligence engine (e.g., such as the AI engine shown in FIG. 2) may perform some or all of the steps described in process flow 400. In some embodiments, an NLP model (e.g., such as the NLP engine shown in FIG. 3) may perform some or all of the steps described in process flow 400.

In some embodiments, and as shown in block 402, the process flow 400 may include the step of receiving an input request to transmit, in real-time, a continuous data stream. In some embodiments, the reception of the input request to transmit the continuous data stream (e.g., screen sharing) may be accomplished via a system (e.g., the system 130 shown and described herein with respect to FIG. 1A-1C) configured to receive the input request (e.g., a user selects a screen share option on an online communications program). For example, a user may be initiating a sharing of an image of a GUI of the user via an online communications platform (e.g., Teams, Webex, Skype, Discord, and/or the like) to a plurality of networked devices (e.g., other users on the same online communications platform). Further, the user may initiate the sharing of the image of the GUI of the user by interacting with a prompt on the online communications platform. Additionally, or alternatively, upon interaction with the prompt, an input request to transmit may be received by the online communications platform.

In some embodiments, and as shown in block 404, the process flow 400 may include the step of analyzing, in response to the input request, the available data in a plurality of data storage locations to identify sensitive data and non-sensitive data. In some embodiments, the GUI may include a plurality of data storage locations (e.g., files stored on a computer device, documents, stored on a computer device, and/or programs stored on a computer device), and each data storage location of the plurality of data storage locations may include data that may potentially be shared via the continuous data stream. Further, the data that may be potentially shared may include sensitive data elements (e.g., information only certain users are authorized to know) and/or non-sensitive data elements.

In some embodiments, a generative AI model (e.g., the artificial intelligence subsystem 200 shown and described herein with respect to FIG. 2) may be configured to perform the steps of analyzing the available data (e.g., in a manner similar to the process flow 500 shown and described herein with respect to FIG. 5). For example, upon reception of the input request to transmit, the generative AI model may be configured to search the available data of each data storage location of the plurality of data storage locations and analyze each data element to determine if the data element may be sensitive or non-sensitive.

In some embodiments, and as shown in block 406, the process flow 400 may include the step of flagging the sensitive data to generate flagged data. In some embodiments, during the analysis of the available data, the generative AI model may determine that a data element of the available data may be sensitive. Further, upon determining the data element may be sensitive, the generative AI may flag that data element to generate a flagged data element. Additionally, or alternatively, the generative AI may generate the flagged data as it flags multiple data elements from the available data. In some embodiments, flagging the sensitive data may include generating labels for the flagged data elements, recording a location (e.g., a file, document, program, pixel coordinates, and/or the like) of the flagged data element in the available data and/or the GUI, and/or storing images of the flagged data element.

In some embodiments, and as shown in block 408, the process flow 400 may include the step of generating a dataset comprising data elements of the flagged data and location data identifying locations of the data elements of the flagged data. In some embodiments, the generative AI may be configured to, upon the first occurrence of flagging a data element, create a dataset (e.g., a list, a table, an array, a file, a record, and/or the like). Additionally, or alternatively, the generative AI may be configured to store the flagged data in the dataset, and store, in the dataset, location data identifying locations of the data elements of the flagged data. In some embodiments, a data element of the flagged data will be linked to the location data in the dataset (e.g., via an index, being stored as a pair, and/or the like).

In some embodiments, and as shown in block 410A, the process flow 400 may include the step of selecting a data element of the flagged data. In some embodiments, upon completion of the dataset of the flagged data and the corresponding location data, the generative AI may be configured to transmit the dataset to a secondary model (e.g., the NLP subsystem architecture shown and described herein with respect to FIG. 3). Further, the secondary model may be configured to select a data element of the flagged data from the dataset that the secondary model has not yet selected for further analysis.

In some embodiments, and as shown in block 410B, the process flow 400 may include the step of analyzing the data element to determine whether the data element is a sensitive data element. In some embodiments, a data element that has been flagged by the generative AI model as sensitive may be analyzed (e.g., in a manner similar to the process flow 600 shown and described herein with respect to FIG. 6) by a secondary model (e.g., the NLP model) to further verify the likelihood the data element is sensitive. In some embodiments, the generative AI model may conclude a data element may be sensitive, but upon further analysis, by the secondary model, it may be determined the data element is not sensitive. Alternatively, the generative AI model may conclude a data element may be sensitive, but upon further analysis, by the secondary model, it may be determined the data element is sensitive. In some embodiments, if the data element is determined by the secondary model to be not sensitive, the secondary model will terminate further steps involving the data element and will select a new data element of the flagged data (e.g., the block 410A). By terminating the further steps involving the data element, the system conserves computing resources, such as processing resources, storage resources, network resources, and/or the like, that would otherwise be consumed by continuing the analysis of the data element.

In some embodiments, and as shown in block 410C, the process flow 400 may include the step of generating a label for the sensitive data element. In some embodiments, the secondary model may conclude a data element of the flagged data is sensitive. Further, the secondary model may be configured to generate a label (e.g., an integer, a Boolean, a string, and/or the like) denoting that the data element is sensitive and will need to be redacted prior to transmitting the continuous data stream.

In some embodiments, and as shown in block 410D, the process flow 400 may include the step of storing the generated label, the sensitive data element, and the location data of the sensitive data element in a data structure. In some embodiments, the secondary model may determine a flagged data element is sensitive and may generate a label for the flagged data element. Further, if the data element is the first data element determined to be sensitive, the secondary model may generate a data structure for storage of the sensitive data element, the generated label, and the location data of the sensitive data element. Alternatively, if the data element is not the first data element determined to be sensitive, the secondary model may store the sensitive data element, the generated label, and the location data of the sensitive data element in the data structure created for the first sensitive data element. In some embodiments, the data structure may be the dataset of block 408, where the flagged data and the associated location data of the data elements determined to be non-sensitive by the secondary model are removed from the dataset and the generated labels for the data elements determined to be sensitive by the secondary model are added to the dataset and linked to the corresponding data element.

In some embodiments, and as shown in block 410E, the process flow 400 may include the step of determining if there are any data elements of the flagged data remaining to be analyzed. In some embodiments, if there are data elements of the flagged data remaining to be analyzed, the secondary model may be configured to return to block 410A of the process flow 400 and repeat the analysis of the next data element of the flagged data. Additionally, or alternatively, if there are no data elements of the flagged data remaining to be analyzed, the secondary mode may be configured to terminate the analysis steps for flagged data.

In some embodiments, and as shown in block 412, the process flow 400 may include the step of redacting sensitive data elements of the flagged data from the available data using the data structure to generate a redacted continuous data stream comprising the redacted sensitive data elements and the non-sensitive data. In some embodiments, the step of redacting sensitive data elements of the flagged data from the available data using the data structure to generate a redacted continuous data stream comprising the redacted sensitive data elements and the non-sensitive data may be performed by the system 130, a third model (e.g., a generative AI model and/or NLP model), and/or a computer program. In some embodiments, the location data for a sensitive data element may be extracted from the data structure. Further, the location data may be used to locate the sensitive data element in a data storage location. Additionally, or alternatively, and upon location, the sensitive data element may be redacted (e.g., fully covered by a black box) so as to prevent a non-authorized entity from viewing the sensitive data element. In some embodiments, a next sensitive data element and the corresponding location data of the next sensitive data element may be extracted from the data structure to next be redacted. Further, each sensitive data element located in the data structure may be redacted until each sensitive data element in the data structure has been redacted. In some embodiments, the data structure may be deleted upon successful redaction of each element. Additionally, or alternatively, the data structure may be kept in a data storage location (e.g., cache memory) for later use.

In some embodiments, the step of redacting sensitive data elements of the flagged data from the available data using the data structure to generate a redacted continuous data stream comprising the redacted sensitive data elements and the non-sensitive data may be performed by the generative AI. Further, the generative AI may be configured to generate a black box to cover the sensitive data elements of the flagged data. Additionally, or alternatively, the generative AI may be configured to generate new text to redact the sensitive data elements of the flagged data. In some embodiments, the generative AI may be configured to generate images to redact sensitive data elements of the flagged data.

In some embodiments, and as shown in block 414, the process flow 400 may include the step of generating a prompt requesting acceptance of the redacted continuous data stream. In some embodiments, a prompt may include a text box containing a list of the redacted data elements of the flagged data, an option to un-redact a redacted data element of the flagged data for each redacted data element of the flagged data, and/or an option to proceed with or terminate the input request to transmit. Further, the option to un-redact a redacted data element of the flagged data for each redacted data element of the flagged data and/or the option to proceed with or terminate the input request to transmit may include at least one interactable visual element. Additionally, or alternatively, the at least one interactable visual element may be configured to allow a user to select a redacted data element of the flagged data and choose to un-redact the redacted data element and/or choose to not transmit or transmit the redacted continuous data stream.

For example, a user may receive a prompt listing 10 redacted data elements and requesting acceptance to transmit a redacted continuous data stream. The user may click a checkbox next to redacted data element 2 and redacted data element 4 of the list of 10 redacted data elements. A confirmation may be generated asking the user to confirm they want to unredact redacted data elements 2 and 4. Upon user confirmation, redacted data elements 2 and 4 may be unredacted. Additionally, or alternatively, the user may then click a visual element in the prompt accepting the transmission of the redacted continuous data stream.

In some embodiments, and as shown in block 416, the process flow 400 may include the step of transmitting, in response to receiving acceptance of the prompt, the redacted continuous data stream. For example, a user may accept a prompt requesting acceptance to transmit a redacted continuous data stream on an online communications platform. Further, the online communications platform may transmit the redacted continuous data stream to a plurality of networked devices. In some embodiments, the transmission of the continuous data stream may be delayed by a threshold time period (e.g., a delay while screen sharing). Additionally, or alternatively, upon introduction of new available data during the transmission of the continuous data stream, the new available data may be analyzed for sensitive data. Further, if new sensitive data is found, the new sensitive data may be redacted under the threshold time period. In some embodiments, the new sensitive data may be redacted using any and/or all of the steps of the process flow 400. In some embodiments, redacting the new sensitive data may not include generating a prompt.

FIG. 5 illustrates a process flow 500 for a generative AI as a step in auto-redacting data in a shared-GUI environment, in accordance with an embodiment of the invention. In some embodiments, a system (e.g., similar to one or more of the systems described herein with respect to FIGS. 1A-1C) may perform one or more of the steps of process flow 500. For example, a data auto-redaction system (e.g., the system 130 described herein with respect to FIG. 1A-1C) may perform the steps of process 500. In some embodiments, an artificial intelligence engine (e.g., such as the AI engine shown in FIG. 2) may perform some or all of the steps described in process flow 500.

In some embodiments, and as shown in block 502, the process flow 500 may include the step of performing the steps of analyzing all available data for sensitive data. In some embodiments, the generative AI may be configured to scan a plurality of data storage locations for sensitive data (e.g., social security numbers, passwords, personal information, dates of birth, account numbers, phone numbers, usernames, IP addresses, physical addresses, and/or the like). For example, the generative AI may navigate to a document containing a plurality of text and images and the generative AI may intake each image and the plurality of text and calculate a probability of sensitivity for each element. In some embodiments, the probability of sensitivity may be calculated via a plurality of model parameters. Further, the plurality of model parameters may be continuously updated as the generative AI model is used. Additionally, or alternatively, the generative AI may be trained on datasets containing sensitive data and/or non-sensitive data to initialize and/or update the plurality of model parameters. In some embodiments, the training datasets may include data that is fabricated (e.g., generated by an AI engine, generated by an individual, and/or the like), and/or that is well known (e.g., data related to historical figures). Further, the fabricated data of the training dataset may be fabricated in such a manner that it appears to be sensitive (e.g., a series of numbers that appear to be a social security number).

In some embodiments, and as shown in block 504, the process flow 500 may include the step of flagging data from the available data that is sensitive. In some embodiments, the generative AI may calculate a probability of sensitivity for a data element the generative AI is analyzing. Additionally, or alternatively, the generative AI may include a threshold for the probability of sensitivity for the data element to be compared against. Further, if the probability of sensitivity is higher than the threshold, the generative AI may flag the data element as sensitive, and, if the probability of sensitivity is lower than the threshold, the generative AI may not flag the data element as sensitive. In some embodiments, if the probability of sensitivity is higher than the threshold, the generative AI may not flag the data element as sensitive, and, if the probability of sensitivity is lower than the threshold, the generative AI may flag the data element as sensitive. In some embodiments, flagging a data element may including generating a label (e.g., a string, an integer, a Boolean, and/or the like) for the data element denoting the data element as sensitive.

In some embodiments, and as shown in block 506, the process flow 500 may include the step of generating a dataset comprising data elements of the flagged data and a plurality of data associated with a location of the data elements of the flagged data. In some embodiments, the generative AI, upon flagging a first data element as sensitive, may generate a dataset to store the first data element. Further, the generative AI may compile a set of location data (e.g., a file containing the first data element, a document containing the first data element, a program containing the first data element, an index of the first data element's location in what contains the first data element, coordinates of the first data element's location in what contains the first data element, and/or the like) and store the set of location data in the dataset. Additionally, or alternatively, the generative AI may link the first data element to the set of location data (e.g., via a common index). In some embodiments, the generative AI will store new data elements flagged as sensitive in the aforementioned dataset along with a set of location data for the new data elements.

FIG. 6 illustrates a process flow 600 for a large language model (LLM) as a step in auto-redacting data in a shared-GUI environment, in accordance with an embodiment of the invention. In some embodiments, a system (e.g., similar to one or more of the systems described herein with respect to FIGS. 1A-1C) may perform one or more of the steps of process flow 600. For example, a data auto-redaction system (e.g., the system 130 described herein with respect to FIG. 1A-1C) may perform the steps of process 600. In some embodiments, an artificial intelligence engine (e.g., such as the AI engine shown in FIG. 2) may perform some or all of the steps described in process flow 600.

In some embodiments, and as shown in block 602, the process flow 600 may include the step of selecting a data element from the flagged data. In some embodiments, the data element may have been flagged as sensitive by a generative AI model. Further, the generative AI model may have incorrectly flagged the data element as sensitive. In some embodiments, a secondary model (e.g., the LLM) may be configured to analyze the data elements flagged as sensitive by the generative AI model along with data elements around the flagged data element to add context to the flagged data element and make a make a determination on the sensitivity status of the flagged data element. For example, the generative AI flags a string of numbers that appears to be a social security number, but, upon analysis by the LLM, the string of numbers is determined to not be a social security number. In some embodiments the LLM may be configured to receive a dataset generated by a generative AI (e.g., a dataset shown and described herein with respect to FIG. 5) containing a plurality of flagged data and corresponding location data. Additionally, or alternatively, the LLM may select a data element from the dataset for further analysis.

In some embodiments, and as shown in block 604, the process flow 600 may include the step of navigating, using the location data associated with the data element, to a location of the data element. In some embodiments, the location data may include an identifier of a file containing the first data element, a document containing the first data element, a program containing the first data element, an index of the first data element's location in what contains the first data element, coordinates of the first data element's location in what contain the first data element, and/or the like. Further, using this location data for the data element, the LLM may select the correct location of the data element as well as the location of other data elements in the vicinity of the data element.

In some embodiments, and as shown in block 606, the process flow 600 may include the step of analyzing data elements in the vicinity of the data element of the flagged data. In some embodiments, the data element, taken alone, may appear to fall into a sensitive data category (e.g., a social security number, a date of birth, private information, and/or the like). Further, the data element, put into context (e.g., the LLM analyzes data elements in the vicinity of the data element), may not fall into a sensitive category. In some embodiments, the LLM may be configured to use location data of the data element of the flagged data to navigate to data elements in the vicinity of the data element of the flagged data. Further, the LLM may be configured to intake the data elements in the vicinity of the data element of the flagged data into the model.

In some embodiments, and as shown in block 608, the process flow 600 may include the step of contextualizing the data element of the flagged data. In some embodiments, the LLM may be configured to, upon navigation to and/or analysis of the data element and/or data elements in the vicinity of the data element, define parameter values associated with the data elements in the vicinity of the data element. Further, the parameter values may be metrics for each data element in the vicinity of the data element associated with the likelihood of a certain context (e.g., a value that indicates the data element may be related to a certain context (e.g., a social security number that is fictional, company data for a fictional company, etc.)). Additionally, or alternatively, the parameter values may be used in the LLM calculations of a plurality of metrics.

In some embodiments, and as shown in block 608, the process flow 600 may include the step of calculating a probability that the data element of the flagged data falls into a sensitive data category. In some embodiments, a probability the data element falls into a sensitive data category may be calculated via a plurality of model parameters. For example, the LLM may be configured to assign each of the data elements in the vicinity of the data element a parameter value, and the LLM may use these parameter values in a calculation of the probability that the data element falls into a sensitive category. Additionally, or alternatively, the LLM may include more model parameters in the calculations of the probability and/or calculations of other metrics.

In some embodiments, the plurality of model parameters may be continuously updated as the LLM is used. Additionally, or alternatively, the LLM may be trained on datasets containing sensitive data and/or non-sensitive data to initialize and/or update the plurality of model parameters. In some embodiments, the LLM may include a threshold for the probability for the data element to be compared against. Further, if the probability is higher than the threshold, the LLM may mark the data element as sensitive, and, if the probability is lower than the threshold, the LLM may not mark the data element as sensitive. In some embodiments, if the probability is higher than the threshold, the LLM may not mark the data element as sensitive, and, if the probability is lower than the threshold, the LLM may mark the data element as sensitive.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for auto-redacting data in a shared-GUI environment, the system comprising:
    at least one memory device with computer-readable program code stored thereon;
    at least one processing device operatively coupled to the at least one memory device, wherein executing the computer-readable code is configured to cause the at least one processing device to:
    receive an input request to transmit, in real-time, a continuous data stream comprising available data;
    analyze, in response to the input request, the available data in a plurality of data storage locations to identify sensitive data and non-sensitive data;
    flag the sensitive data to generate flagged data;
    generate a dataset comprising data elements of the flagged data and location data identifying locations of the data elements of the flagged data;
    for each data element of the flagged data:
        analyze the data element to determine whether the data element is a sensitive data element;
        generate a label for the sensitive data element; and
        store the generated label, the sensitive data element, and the location data of the sensitive data element in a data structure;
    redact sensitive data elements of the flagged data from the available data using the data structure to generate a redacted continuous data stream comprising the redacted sensitive data elements and the non-sensitive data;
    generate a prompt requesting acceptance of the redacted continuous data stream; and
    transmit, in response to receiving acceptance of the prompt, the redacted continuous data stream.

2. The system of claim 1, wherein a generative artificial intelligence (AI) is configured to perform the steps of analyzing all available data for sensitive data, flag data from that available data that is sensitive, and generate a dataset comprising data elements of the flagged data and a plurality of data associated with a location of the data elements of the flagged data.

3. The system of claim 1, wherein a language model is configured to perform the analysis of a data element of the flagged data from the dataset, and wherein the analysis comprises:
   selecting a data element from the flagged data;
   navigating, using the location data associated with the data element, to a location of the data element;
   analyzing data elements in a vicinity of the data element of the flagged data;
   contextualizing the data element of the flagged data; and
   calculating a probability that the data element of the flagged data falls into a sensitive data category.

4. The system of claim 1, wherein the redacted continuous data stream is transmitted to a plurality of networked devices.

5. The system of claim 4, wherein transmission of the redacted continuous data stream is delayed by a period of time to the plurality of networked devices.

6. The system of claim 5, wherein upon new available data, the system is configured to analyze the new available data and redact new sensitive data under the period of time.

7. The system of claim 1, wherein the prompt comprises a text box comprising:
   a list of the redacted data elements of the flagged data;
   an option to un-redact a redacted data element of the flagged data for each redacted data element of the flagged data; and
   an option to proceed with or terminate the input request to transmit.

8. The system of claim 1, wherein a report of all redacted data is stored upon termination of the redacted continuous data stream.

9. A computer program product for auto-redacting data in a shared-GUI environment, the computer program product comprising a non-transitory computer-readable medium comprising code causing an apparatus to:
   receive an input request to transmit, in real-time, a continuous data stream;
   analyze, in response to the input request, available data in a plurality of data storage locations to identify sensitive data;
   flag the sensitive data to generate flagged data;
   generate a dataset comprising data elements of the flagged data and location data identifying locations of the data elements of the flagged data;
   for each data element of the flagged data:
   analyze the data element to determine whether the data element is a sensitive data element;
   generate a label for the sensitive data element; and
   store the generated label, the sensitive data element, and the location data of the sensitive data element in a data structure;
   redact sensitive data elements of the flagged data from the available data using the data structure to generate a redacted continuous data stream;
   generate a prompt requesting acceptance of the redacted continuous data stream; and
   transmit, in response to receiving acceptance of the prompt, the redacted continuous data stream.

10. The computer program of claim 9, wherein a generative artificial intelligence (AI) is configured to perform the steps of analyzing all available data for sensitive data, flag data from that available data that is sensitive, and generate a dataset comprising data elements of the flagged data and a plurality of data associated with a location of the data elements of the flagged data.

11. The computer program of claim 9, wherein a language model is configured to perform the analysis of a data element of the flagged data from the dataset, and wherein the analysis comprises:
   selecting a data element from the flagged data;
   navigating, using the location data associated with the data element, to a location of the data element;
   analyzing data elements in a vicinity of the data element of the flagged data;
   contextualizing the data element of the flagged data; and
   calculating a probability that the data element of the flagged data falls into a sensitive data category.

12. The computer program of claim 9, wherein transmission of the redacted continuous data stream is delayed by a period of time to a plurality of networked devices.

13. The computer program of claim 12, wherein upon new available data, the computer program is configured to analyze the new available data and redact new sensitive data under the period of time.

14. The computer program of claim 9, wherein the prompt comprises a text box comprising:
   a list of the redacted data elements of the flagged data;
   an option to un-redact a redacted data element of the flagged data for each redacted data element of the flagged data; and
   an option to proceed with or terminate the input request to transmit.

15. A method for auto-redacting data in a shared-GUI environment, the method comprising:
   receiving an input request to transmit, in real-time, a continuous data stream;
   analyzing, in response to the input request, available data in a plurality of data storage locations to identify sensitive data;
   flagging the sensitive data to generate flagged data;
   generating a dataset comprising data elements of the flagged data and location data identifying locations of the data elements of the flagged data;
   for each data element of the flagged data:
   analyzing the data element to determine whether the data element is a sensitive data element;
   generating a label for the sensitive data element; and
   storing the generated label, the sensitive data element, and the location data of the sensitive data element in a data structure;
   redacting sensitive data elements of the flagged data from the available data using the data structure to generate a redacted continuous data stream;
   generating a prompt requesting acceptance of the redacted continuous data stream; and
   transmitting, in response to receiving acceptance of the prompt, the redacted continuous data stream.

16. The method of claim 15, wherein analyzing the available data comprises performing, via a generative artificial intelligence (AI), the steps of analyzing all available data for sensitive data, flagging, via the generative AI, data from that available data that is sensitive, and generating, via the generative AI, a dataset comprising data elements of the flagged data and a plurality of data associated with a location of the data elements of the flagged data.

17. The method of claim 15, wherein a language model is configured to perform the analysis of a data element of the flagged data from the dataset, and wherein the analysis comprises:

selecting a data element from the flagged data;

navigating, using the location data associated with the data element, to a location of the data element;

analyzing data elements in a vicinity of the data element of the flagged data;

contextualizing the data element of the flagged data; and calculating a probability that the data element of the flagged data falls into a sensitive data category.

18. The method of claim 15, wherein transmission of the redacted continuous data stream is delayed by a period of time to a plurality of networked devices.

19. The method of claim 18, wherein upon new available data, the method comprises:

analyzing the new available data; and redacting new sensitive data under the period of time.

20. The method of claim 15, wherein the prompt comprises:

listing, in a text box, the redacted data elements of the flagged data;

giving, in the text box, an option to un-redact a redacted data element of the flagged data for each redacted data element of the flagged data; and giving, in the text box, an option to proceed with or terminate the input request to transmit.

* * * * *